United States Patent
Dillaman (10) Patent No.: US 11,449,225 B2
(45) Date of Patent: Sep. 20, 2022

(54) REHYDRATION OF A BLOCK STORAGE DEVICE FROM EXTERNAL STORAGE

(71) Applicant: Red Hat, Inc., Raleigh, NC (US)

(72) Inventor: Jason A. Dillaman, Richmond, VA (US)

(73) Assignee: Red Hat, Inc., Raleigh, NC (US)

(*) Notice: Subject to any disclaimer, the term of this patent is extended or adjusted under 35 U.S.C. 154(b) by 26 days.

(21) Appl. No.: 17/034,573

(22) Filed: Sep. 28, 2020

(65) Prior Publication Data
US 2022/0100371 A1    Mar. 31, 2022

(51) Int. Cl.
*G06F 3/06* (2006.01)

(52) U.S. Cl.
CPC ............ *G06F 3/0604* (2013.01); *G06F 3/064* (2013.01); *G06F 3/067* (2013.01); *G06F 3/0655* (2013.01)

(58) Field of Classification Search
None
See application file for complete search history.

(56) References Cited

U.S. PATENT DOCUMENTS

| | | | |
|---|---|---|---|
| 9,092,375 B1 | 7/2015 | Dalal et al. | |
| 9,329,943 B2 | 5/2016 | Teli | |
| 9,384,094 B2 | 7/2016 | Teli | |
| 9,575,680 B1 | 2/2017 | Zhang | |
| 9,792,187 B2 | 10/2017 | Mutalik | |
| 2015/0052366 A1* | 2/2015 | Bachu | G06F 21/602 713/189 |
| 2015/0278032 A1 | 10/2015 | Shvechkov et al. | |
| 2016/0103866 A1* | 4/2016 | Robinson | G06F 9/466 707/703 |
| 2019/0340136 A1* | 11/2019 | Irwin | G06F 3/0683 |
| 2020/0104212 A1 | 4/2020 | Balcha et al. | |

OTHER PUBLICATIONS

Graefe, "Instant Recovery for Data Center Savings", Jun. 2015, 6 pages https://dl.acm.org/doi/pdf/10.1145/2814710.2814716.

* cited by examiner

*Primary Examiner* — Brian R Peugh
(74) *Attorney, Agent, or Firm* — Lowenstein Sandler LLP (57) ABSTRACT

Systems and methods for providing rehydration of a block storage device from external storage are disclosed. In one implementation, a processing device may receive, from a client computing device, a request to access a portion of data associated with a block-based repository in a distributed storage system, where the block-based repository is associated with an external data source that stores a backup of the block-based repository; determine that the portion of data is not present in the block-based repository; retrieve the portion of data from the external data source; provide the portion of data to the client computing device; and perform deep rehydration of the requested portion of data, wherein the deep rehydration reconstructs the portion of data in the block-based repository using the external data source.

20 Claims, 6 Drawing Sheets

REHYDRATION OF A BLOCK STORAGE DEVICE FROM EXTERNAL STORAGE

TECHNICAL FIELD

The present disclosure is generally related to computer systems, and more particularly, to rehydration of a block storage device from external storage.

BACKGROUND

Modern computers often store data in a distributed data store to enhance the access, redundancy, and capacity of data storage devices. The distributed data store may include multiple storage nodes that function to store, organize, and provide access to data. Data may be stored at block-based repositories (e.g., block devices) that facilitate the storage of block-based data, where the data can be divided into portions (e.g., chunks) that are striped across the distributed data store.

BRIEF DESCRIPTION OF THE DRAWINGS

The present disclosure is illustrated by way of examples, and not by way of limitation, and may be more fully understood with references to the following detailed description when considered in connection with the Figures, in which.

DETAILED DESCRIPTION

Described herein are methods and systems for instant deep rehydration of a block storage device from external storage within a distributed storage system. Distributed storage systems often incorporate the features of distributed data stores and enable multiple clients to access and modify data of the distributed storage system. The distributed data stores may enhance performance of a computer system, reliability of the computer system, or a combination thereof. The distributed data stores may include a set of physical devices, virtual devices, or a combination thereof. Data may be stored at block-based repositories (e.g., block devices), file-based repositories (e.g., files and directories), object-based repositories (e.g., object-based buckets and containers), other repositories, or a combination thereof.

A block-based repository divides a file into singular units of data and stores these units as separate data entities within block devices. Each data entity (e.g., a block) has a different address, so they may be stored at different block devices, as opposed to a file structure. A block device refers to a computer data storage device that supports reading data in large, fixed-size blocks, sectors, or clusters, as opposed to a small number of bytes at a time. A block device can often preserve state history of its associated storage using immutable block devices (e.g., block device snapshots). A block device snapshot stores a point-in-time version of the data associated with the block device at the time the snapshot was taken. These snapshots can be chained together in a parent-child relationship to provide a deep historical representation of changes made to the data stored by the block device over a period of time.

In many conventional systems, block devices can be archived (e.g., backed up) to object storage either within the same storage cluster or to an external storage system with a compatible communication interface. These types of implementations can provide means for recovery of the block device in the event of data loss, data corruption, system failure, or the like. Conventional systems, however, often restore archived copies of block devices by restoring the current state of the data without the deep historical snapshot chain. These types of solutions limit the recovery options when a data corruption event is encountered but the last known valid data is not immediately identifiable. For example, if a virus invades a system and corrupts the data at a previous point in time, restoring to the previous snapshot may not be a viable remedy. Some conventional systems can address this by providing full deep historical recovery by rebuilding the snapshot chain for a block device (e.g., deep rehydration). These solutions, however, typically involve making the block device unavailable to a client/tenant/user until the entire snapshot chain has been rebuilt. This can often result in significant delays in data recovery, leading to increases in system availability and deployment in disaster recovery situations.

Aspects of the present disclosure address the above and other deficiencies by implementing technology to facilitate instant deep rehydration for a block storage device from external storage. In particular, a block device rehydration manager can initiate the deep recovery of a block device that has experienced data loss, corruption, etc. by creating a new thinly provisioned block device image in the distributed storage system. The block device rehydration manager can configure the new block device image to create a link between the newly provisioned image and a backup of the block device snapshot chain stored at an external data source (e.g., an external distributed storage system, external storage device, external tape device, etc.). Thus, the new block device image can be configured such that the most recent snapshot in the backup snapshot chain can act as the "parent" node to the new block device image, causing any subsequently received requests to access the data to be directed to the backup snapshot chain until the block device has been fully rehydrated in the local distributed storage system.

In one implementation, the block device rehydration manager can receive a request to access data associated with the block device. The block device rehydration manager can determine whether the requested data is present in the local block device image, and if not, retrieve that data from the linked backup snapshot chain stored at the external data source. The block device rehydration manager can subsequently provide the most recent version of the data retrieved from the backup snapshot chain to the requestor (e.g., client/tenant/user). Additionally, in parallel to providing the data to the requestor, the block device rehydration manager can perform a deep rehydration operation for the requested data to reconstruct the snapshot chain for that data in the local block device image. In some implementations, the block device rehydration manger can additionally initiate a background process to perform deep rehydration for all data associated with the block device to reconstruct the snapshot chain for the entire block device.

Aspects of the present disclosure present advantages over conventional solutions to the issues noted above. First, by thinly provisioning a new block device image that is linked with a backup of the snapshot chain, recovery of the block device can be near-instantaneous. This, in turn, can significantly reduce system downtime during disaster recovery scenarios. Additionally, by performing deep hydration of the entire block device snapshot chain, a more robust historical representation of the data can be recovered when compared with conventional implementations. Moreover, the restored block device can be utilized by clients/tenants/users concurrently with the deep rehydration performed in the background, which can significantly improve data access and system availability.

Figure 1:
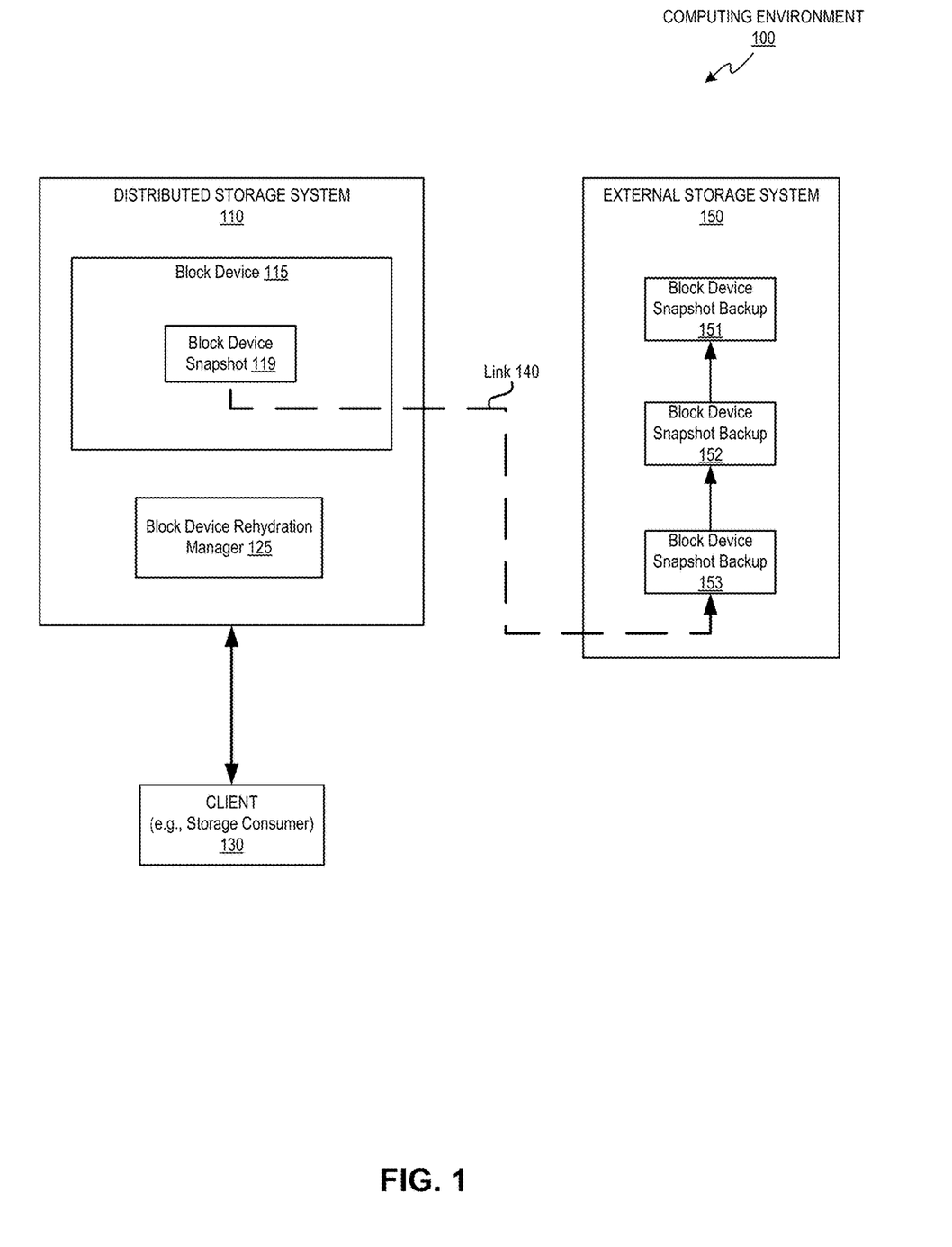
FIG. 1 illustrates an exemplary computing environment in which implementations of the disclosure may operate.

FIG. 1 illustrates an exemplary computing environment 100 in which implementations of the disclosure may operate. Computing environment 100 may include multiple computing devices associated with one or more cloud environments, data centers, data rooms, other arrangement of devices, or a combination thereof. In one example, computing environment 100 may include a distributed storage system 110 (e.g., storage provider), one or more data access methodologies 115-117 (e.g., blocks, objects, file storage), and one or more clients 130A-C (e.g., storage consumers).

Distributed storage system 110 may store and manage the distribution of data across multiple storage nodes and may provide access to data via a storage interface (not pictured). A block-based storage service may provide access to data at a block level and may be similar to one or more block level storage devices (e.g., Storage Area Network (SAN) device or array). An object-based storage may provide access to immutable data objects using an object-based gateway (e.g., a RESTful web service interface). A file-based storage service may provide access to data at a file and directory level and may be similar to file level storage devices (e.g., Network Attached Storage (NAS) devices). In one example, distributed storage system 110 may be the same or similar to Ceph, Gluster, Oracle® Automatic Storage Management (e.g., ASM), Hadoop® Distributed File System (HDFS), Andrew File System (AFS), Google® File System (GFS), other data storage system, or a combination thereof that is capable of storing object data (e.g. content) on one or more storage nodes.

Distributed storage system 110 may include one or more block devices 115 that represent block-based storage for storing mutable data objects within distributed storage system 110. In an implementation, block-based storage interfaces may be used to store data within media devices such as hard disks, CDs, floppy disks, and a combination thereof. Block devices 115 may store data over multiple object storage daemons (OSD)s within a storage cluster. In certain implementations, block device 115 may leverage the reliable autonomic distributed object store (RADOS) capabilities such as snapshot creation, replication, and fault-tolerance. RADOS is an open source object storage service that may be an integral part of distributed storage system 110 (e.g., Ceph storage system). In such instances, a RADOS block device (RBD) interface may interact with storage nodes to store and retrieve data using kernel modules.

Block device snapshot 119 may be an immutable data object representing data of a specific block device at a given point in time. Block device snapshot 119 may be accessed a using block device interface 122 by one or more clients for viewing, updating, deleting, creating data objects within block devices 115. In various implementations, block device snapshot 119 may be one or more additional snapshots of block device 115 that are captured over time. These snapshots may, in turn, be backed up to an external storage system 150 for archival purposes (e.g., block device snapshot backups 151, 152, 153).

In various implementations, external storage system 150 can be a secondary distributed storage system that is configured similarly to distributed storage system 110. In some instances, external storage system 150 can be exposed to distributed storage system 110 via a compatible object interface (e.g., Amazon S3™, SWIFT™, etc.). Alternatively, external storage system 150 can be configured using slower and/or less expensive storage medium for disaster recovery and/or archive purposes such as conventional disk storage, magnetic tape, or the like.

As shown, the external storage system 150 can store block device snapshot backups associated with block device snapshot 119. In various implementations, the block device snapshot backups 151, 152, 153 can be archived to preserve the parent-child relationships between the snapshots when captured by distributed storage system 110 for block device 115. As shown, block device snapshot backup 153 refers back to block device snapshot backup 152, indicating that block device snapshot backup 153 is a child node of block device snapshot backup 152 (the parent node). Similarly, block device snapshot backup 152 refers back to block device snapshot backup 151, indicating that block device snapshot backup 152 is a child node of block device snapshot backup 151 (the parent node of 152, the grandparent node of 153). Additionally, block device snapshot deltas (not pictured) can be archived that preserve the differences between the different snapshots.

In some implementations, block device snapshot 119 may experience data loss, data corruption, or other disaster recovery related issue that may result in the need to recover the block device from block device backups stored at the external storage system 150 (e.g., block device snapshot backups 151, 152, 153). In such instances, block device rehydration manager 125 can be invoked by a system administrator, data owner, etc. to create a new block device image for block device snapshot 119 and initiate recovery of the associated historical snapshot data. In some implementations, the new block device snapshot can be thinly provisioned, taking up little to no actual space in the distributed storage system 100, initially including metadata that defines the parameters of the new image for block device snapshot 119. Block device rehydration manager 125 can then link (e.g., link 140) the new block image with the backups of block device snapshot (e.g., block device snapshot backups 151, 152, 153) and any associated snapshot delta chain for block device 115 stored at the external data source 150.

As shown in FIG. 1, block device rehydration manager 125 can establish link 140 that indicates that block device snapshot 119 is the child node of block device snapshot backup 153. Thus, any subsequently received requests to access data from block device snapshot 119 can be redirected to the block device snapshot backup chain stored in external storage system 150 if the data is not found in the local block device snapshot 119. In this way, access to the data for block device 115 can be instantly (or nearly instantly) recovered even though the data has not yet been rehydrated to the local block device 115 in distributed storage system 110.

In some implementations, a request can be received from client 130 to access data from block device 115. In such instances, block device rehydration manager 125 can be invoked to determine whether the data is present in block device snapshot 119. If so, the data can be returned to client 130. If this request is the initial instance of accessing that data after the new image for block device snapshot 119 has been created (e.g., after initiating disaster recovery for the block device 115), the data would most likely not be found. In such instances, block device rehydration manager 125 can redirect the request using link 140 to access the parent node snapshot for block device snapshot 119 (e.g., block device snapshot backup 153 in external storage system 150). If the data is found in block device snapshot backup 153, it can be returned to the client 130. Otherwise, the next snapshot in the parent-child chain can be accessed (e.g., block device snapshot backup 152). Each node in the snapshot chain in reverse time order (153, then 152, then 151, etc.) can be accessed until the data has been located and returned to the client 130.

Block device rehydration manager 125 can additionally perform deep rehydration of the requested data by reconstructing the chain of block device snapshots in block device 115. In some implementations, block device rehydration manager 125 can perform the rehydration operation in parallel with providing the requested data to client 130. Alternatively, bock device rehydration manager 125 can perform the rehydration operation before or after providing the requested data to client 130. In some implementations, block device rehydration manager 125 can perform the rehydration operation only for the requested data. Alternatively, block device rehydration manager 125 can perform the rehydration operation for all data associated with the block device. Thus, the entire block device snapshot chain can be reconstructed for block device 115. Block device rehydration manager 125 is described in further detail below with respect to FIG. 4. Illustrations of the rehydration process are described below with respect to FIGS. 2-3.

Client 130 may be a computing device that can access data hosted at distributed storage system 110. Client 130 may include a client portion of an object access service (e.g., standardized storage access technology) and may function as a client (e.g., storage consumer) of one or more of the storages nodes (e.g., blocks, objects, files). The client portion of the object access service may execute at any level of privilege such as running as part of a kernel or in a kernel mode (e.g., supervisor, master, privileged mode) or as part of a user space in user mode. Object access service may be packaged with an operating system or may be added or installed to an existing operating system. In one example, object access service may include a mount process (e.g., daemon, service) that runs on client 130 and may support an operating systems native API. The native API may be any standardized or proprietary operating system API, such as the Portable Operating System Interview (POSIX) API or the Microsoft Windows® API.

Client 130 may be physical devices (e.g., physical machines), virtual device (e.g., virtual machine, container, etc.), or a combination thereof. One or more of the clients may be absent virtualization technology and one or more of the clients may provide one or more levels of virtualization. The levels of virtualization may include hardware level virtualization, operating system level virtualization, other virtualization, or a combination thereof. The hardware level virtualization may involve a hypervisor (e.g., virtual machine monitor) that emulates portions of a physical system and manages one or more virtual machines. In contrast, operating system level virtualization may include a single operating system kernel that manages multiple isolated virtual containers. Each virtual container may share the kernel of the underlying operating system without requiring its own kernel.

Computing environment 100 may include one or more networks. The one or more networks may include a public network (e.g., the internet), a private network (e.g., a local area network (LAN) or wide area network (WAN)), or a combination thereof. In one example, the network may include a wired or a wireless infrastructure, which may be provided by one or more wireless communications systems, such as a wireless fidelity (WiFi) hotspot connected with the network and/or a wireless carrier system that may be implemented using various data processing equipment, communication towers, etc.

Figure 2:
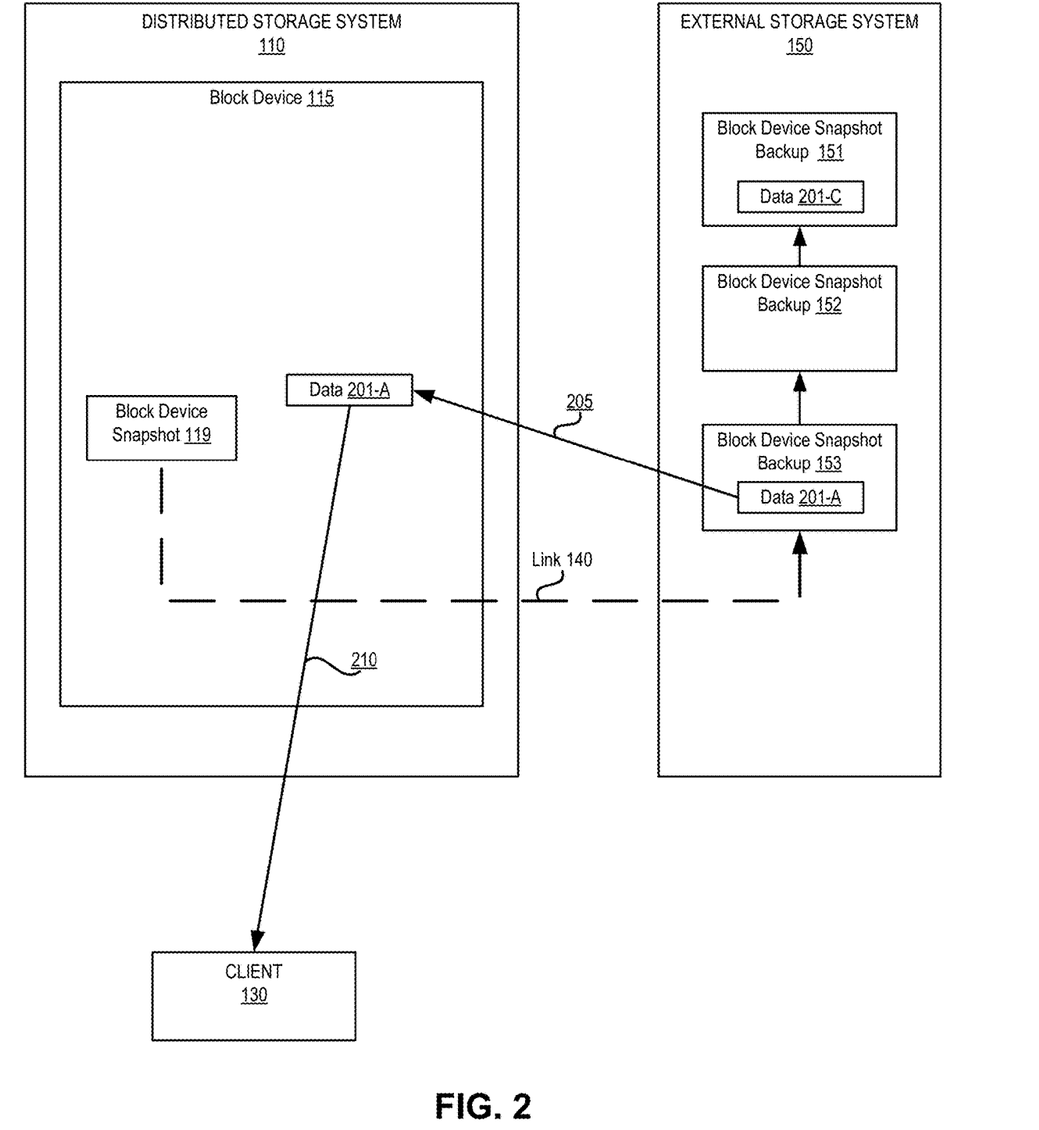
FIG. 2 depicts an illustration of establishing a link between a block device and external storage system to facilitate instant deep rehydration for a block storage device from external storage, in accordance with one or more aspects of the present disclosure.

FIG. 2 depicts an illustration of establishing a link between a block device and external storage system to facilitate instant deep rehydration for a block storage device from external storage. As described above, the block device rehydration manager can establish a link 140 that associates a new block device snapshot 119 with a chain of block device snapshot backups 151, 152, 153. As shown in FIG. 2, block device snapshot backups 151, 152, 153 can be arranged in a parent-child structure that is organized by time of the snapshots. Also as shown, block device snapshot backups 151 and 153 include snapshots of a data element 201 (depicted as data 201-C and 201-A respectively. This indicates that at the time block device snapshot 151 was stored, data element 201 was stored with the value represented by data 201-C. At the time that block device snapshot 152 was stored, there was no change in the value for the data stored at data 201. Thus, the block device snapshot backup 152 contains no update to that data element. Subsequently, at the time block device snapshot 153 was stored, there was a change in the value for the data stored at data 201, which is depicted as data 201-A.

Responsive to receiving a request from client 130 for data 201, block device rehydration manager can determine whether that data is stored locally in block device 115. If so, it can be provided to the client 130. As shown in FIG. 2, data 201 is not initially present in block device 115, so block device rehydration manager can redirect the request via link 140 to determine if data 201 is present in any of the chain of block device snapshot backups 151, 152, 153. As shown, the version of data 201 depicted as data 201-A is present in block device snapshot backup 153, so that version of data 201 is provided to block device rehydration manager (illustrated by arrow 205). Block device rehydration manager can then store a copy of data 201-A locally for block device 115 and provide that data to client 130 (illustrated by arrow 210). Additionally, block device rehydration manager can initiate the deep hydration operation to rebuild the snapshot chain for data 201 so that it is local to block device 115. The rehydration process is illustrated and described below with respect to FIG. 3.

Figure 3:
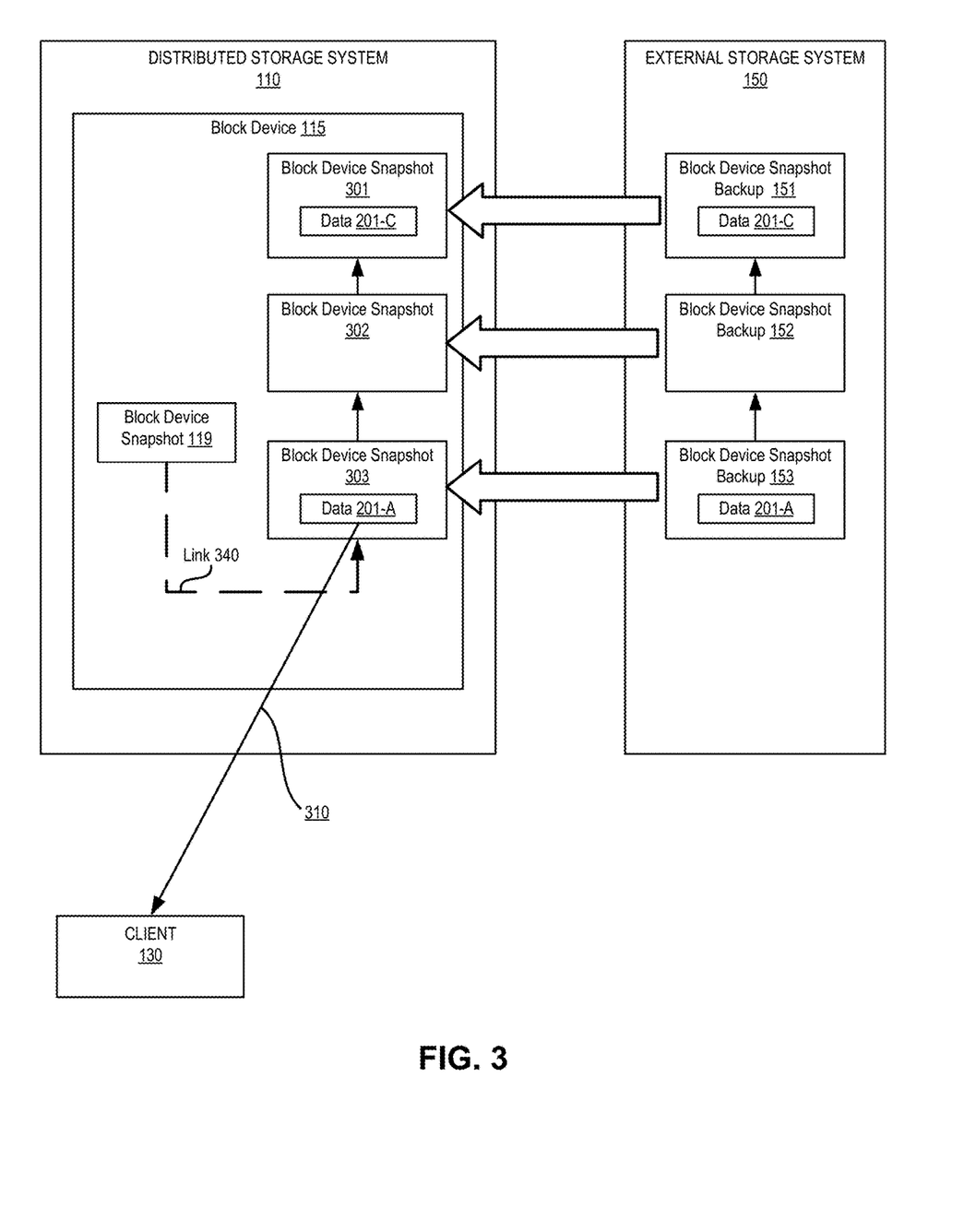
FIG. 3 depicts an illustration of performing instant deep rehydration for a block storage device from external storage, in accordance with one or more aspects of the present disclosure.

FIG. 3 depicts an illustration of performing instant deep rehydration for a block storage device from external storage. As described above in FIG. 2, once data 201-A has been provided to client 130, block device rehydration manager can initiate deep rehydration of the block device snapshot chain stored in external storage 150. In some implementations, block device rehydration manager can rehydrate the portions of the block device snapshot backup chain for data 201 specifically. In those instances, any subsequent request for data 201 can be served by the local block device 115. Any subsequent request to access any other additional data element can still be redirected to the external storage system until such time that the snapshot chain for that additional data element has been rehydrated. In other implementations, block device rehydration manager can initiate the rehydration process for all data stored in the backups.

As shown in FIG. 3, block device rehydration manager can perform the deep rehydration operation by copying the data from block device snapshot backups 151, 152, 153 in external storage system 150 to the corresponding block device snapshots 301, 302, 303 of block device 115 respectively. Thus, upon completion of the rehydration for data 201, block device snapshot 301 can include a copy of data 201-C that is recovered from block device snapshot backup 151. Similarly, block device snapshot 303 can include a copy of data 201-A that is recovered from block device snapshot backup 153. As shown, the rebuilt snapshot chain in block device 115 preserves the parent-child relationships between snapshots 151, 152, 153.

Once the snapshot chain for data 201 has been rehydrated, the link 140 between block snapshot 119 and block device snapshot backup 153 can be deleted for data 201. As described below, this can be accomplished by storing index data associated with the snapshots 301, 302, 303 and backups 151, 152, 153 that indicate which data elements are local to block device 115 and which data elements have not yet been rehydrated. As shown, block device rehydration manager can utilize the index data to establish link 340 that associates block device snapshot 119 with block device snapshot 303 for at least data 201. Subsequently, if client 130 (or any other client device or process) issues another request to access data 201, block device 115 can service the request locally using the data stored in block device snapshot 303.

Figure 4:
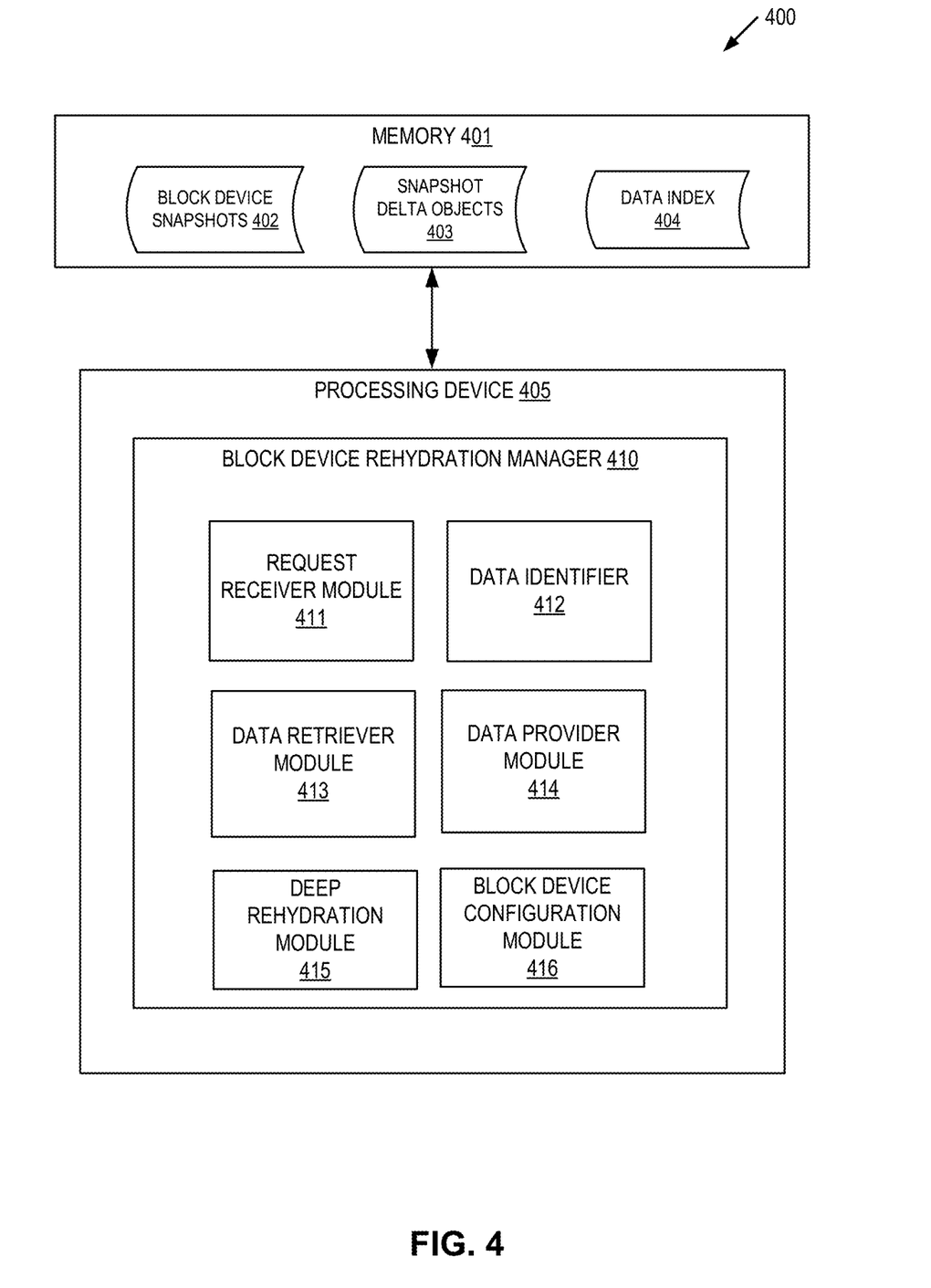
FIG. 4 depicts a block diagram illustrating an example of a block device rehydration manager that facilitates instant deep rehydration of a block storage device from external storage, in accordance with one or more aspects of the present disclosure

FIG. 4 depicts a block diagram illustrating an example of a block device rehydration manager 410 for facilitating instant deep rehydration for a block storage device from external storage. In some implementations, block device rehydration manager 410 may correspond to block device rehydration manager 125 of FIG. 1. As shown in FIG. 4, block device rehydration manager 410 may be a component of a computing apparatus 400 that includes a processing device 405, operatively coupled to a memory 401, to execute block device rehydration manager 410. In some implementations, processing device 405 and memory 401 may correspond to processing device 602 and main memory 604 respectively as described below with respect to FIG. 6. In various implementations, computing apparatus 400 can be a standalone host computing device that communicates with various tenant/client computing devices. Alternatively, computing apparatus 400 can be a component of a cloud computing environment made up of multiple host computing devices, an Internet of Things (IoT) edge device, or the like.

Block device rehydration manager 410 may include request receiver module 411, data identifier 412, data retriever module 413, data provider module 414, deep rehydration module 415, and block device configuration module 415. Alternatively, the functionality of one or more of request receiver module 411, data identifier 412, data retriever module 413, data provider module 414, deep rehydration module 415, and block device configuration module 415 may be combined into a single module or divided into multiple sub-modules.

Request receiver module 411 is responsible for receiving a request to access a portion of data associated with a block-based repository in a distributed storage system. In various implementations, the request can be received from a client computing device that communicates with the distributed storage system. As noted above, the block-based repository can include one or more block device snapshots of the data stored in the block-based repository. In an illustrative example, the various block device snapshots can be configured in a parent-child relationship structure. For example, one block device snapshot of the data stored in the block-based repository at one time may be the parent of a second block device snapshot (e.g., child) of data stored in the block-based repository at a time after the first time. Additionally, the block-based repository can include snapshot deltas that reflect the differences between the block device snapshots.

Also as noted above, in some implementations the block-based repository may be configured to be associated with an external data source that stores a backup of the block-based repository. For example, the owner or administrator of the distributed storage system may configure the block-based repository such that it can be backed up to the external data source. In such instances, the external data source can include backup copies of the block device snapshots and snapshot deltas. Thus, the external data source can include a backup of the block device snapshot parent-child relationship chain with the associated differences between them as stored in the snapshot deltas. In various implementations, if the block-based repository becomes corrupt, deleted, or the like, the owner or administrator can initiate a recovery process to rebuild the entire snapshot and snapshot delta chain for the block-based repository (e.g., initiate deep rehydration of the block-based repository) without preventing client devices from accessing the data stored on the block-based storage device. In such instances, block configuration module 415 can be invoked.

Block device configuration module 415 is responsible for configuring the block-based repository to facilitate the deep rehydration process. In various implementations, block device configuration module 415 can configure the block-based repository with a new block image to serve as a replacement for the image that encountered the data corruption or failure as noted above. The new block image can be thinly provisioned, taking up little to no actual space in the distributed storage system, initially including metadata that defines the parameters of the new image. Block device configuration module 415 can then link the new block image with the backups of block device snapshot and snapshot delta chain for the block-based repository stored at the external data source.

In an illustrative example, block device configuration module 415 can configure the new block image as a child of the most recent block device snapshot backup at the external data source. Thus, the most recent block device snapshot backup can serve as the parent to the new block image in the block-based repository. As noted above, the external data source can store the full historical snapshot and snapshot delta chains for the block-based repository. By linking the new block image to the backups, any subsequent requests to access data from the block-based repository (e.g., the request received by request receiver module 211) can be serviced immediately without involving added downtime.

Data identifier 412 is responsible for determining whether the portion of data requested by the client/tenant is present in the block-based repository. In various implementations, data identifier 412 can access the new block image created in the block-based repository to make this determination. If the requested data is not present in the new block image, data identifier 412 can determine that the new block image is a child node associated with a parent block device snapshot stored at the external data source (e.g., the backup of the most recent block device snapshot of the block-based repository). Data retriever module 413 can be subsequently invoked to retrieve the requested data.

Data retriever module 413 is responsible for retrieving the requested portion of data from the external data source. In other words, data retriever module 413 can effectively redirect the received request to access the data to the backup data source to retrieve the requested data from the backup snapshot chain. Data retriever module 413 can access the backup snapshot image that is the parent of the new block image and determine whether the requested data is present in that snapshot image. If so, the data can be retrieved from that snapshot. Otherwise, data retriever module 413 can determine the next snapshot image in the associated snapshot chain (e.g., the parent of the backup snapshot being examined and the "grand-parent" of the new block image). Data retriever module 413 can follow the chain of snapshot backups until the requested data is located. Once the most recent version of the requested data has been located within the chain of snapshot backups, data retriever module 413 can store the data in the new block image of the block-based repository.

In various implementations, the bock-based repository can be configured with extents of a particular size (e.g., chunk size). In such instances, the chunk size can be set to the default unit of data retrieval and/or restoration. In some cases, the chunk size can be a different size than that of the receive data access request. For example, a default chunk size can be set to 4 megabytes. If a request is received for 1 kilobyte of data, data retriever module 413 can retrieve the default chunk size of 4 megabytes from the external data source and store that 4 megabytes in the new block image of the block-data repository.

Data provider module 414 is responsible for providing the retrieved data to the requesting client/tenant device. In instances where the amount of data requested is different from the default chunk size for the block-data repository, data provider module 414 can provide the amount requested rather than the amount of the default chunk size.

Deep rehydration module 415 is responsible for performing deep rehydration of the requested data into the block-data repository. In various implementations, deep rehydration module 415 can reconstruct the historical chain of block device snapshots (e.g., stored as block device snapshots 402) and snapshot deltas (e.g., stored as snapshot delta objects 403) for the block-data repository from the backups stored in the external data source. In some instances, deep rehydration module 415 can be invoked in parallel with data provider module 414. Thus, while data provider 414 provides the latest version of the requested data to the client/tenant device, deep rehydration module 414 can analyze the chain of block device snapshots and snapshot delta information and reconstruct those elements within the block-data repository of the local distributed storage system. The deep rehydration module 415 can thus "rehydrate" the requested data with its full associated snapshot history as it had existed as of its last backup.

In some implementations, once the deep rehydration of the requested data has completed, deep rehydration module 415 can modify index information associated with the block-based repository (e.g., data index 404) to indicate that the requested data is now present in the local image of the block-based repository. If a subsequent request is received to access the same data, data identifier 412 can determine that the data is local to the block-based repository and bypass forwarding the request to the external data source to retrieve from the backups of the block device snapshots.

In various implementations, deep rehydration module 415 can additionally be invoked to rehydrate any additional data associated with the block-data repository. In other words, deep rehydration module 415 can reconstruct the entire chain of block device snapshots and snapshot deltas for the block-data repository using the backup data stored at the external data source. In some instances, deep rehydration module 415 can be invoked to perform this additional rehydration operation responsive to receiving the first request to access data from the new block image (e.g., the first occurrence of a data access once the new block image has been created in the block-based repository). Alternatively, deep rehydration module 415 can be invoked by block device configuration module 416 when the new block image for the block-data repository has been configured (e.g., once the new block image created in the block-based repository and linked to the backups in the external storage device).

Deep rehydration module 415 can iterate through the entire chain of block device snapshots and snapshot deltas using the backups at the external data source. Deep rehydration module 415 can then reconstruct this data within the local block-data repository. Once all data has been retrieved from the backups and rehydrated in the block-based repository, deep rehydration module 415 can update the information in data index 404 to indicate that all data is now present in the local image of the block-based repository. Subsequently, the link between the new block image and the backup snapshot images at the external data source can be deleted.

In various implementations, deep rehydration module 415 can rehydrate the block-data repository in parallel with receiving additional requests to access the data whether or not that data has been fully rehydrated into the local block-data repository. As noted above, for those portions of data that have not yet been rehydrated, data identifier 412 can continue to redirect the requests to retrieve the requested data from the backups at the external data source.

In some implementations, the deep rehydration process can be performed to prevent data conflicts between any subsequent requests received from multiple client/tenant devices to rewrite data to the block-data repository for the same data. For each portion of a block device snapshot data to be restored, a write operation can be performed on the block-data repository with a unique identifier that identifies the particular snapshot, the data location, or other similar location. The rehydration process write operation can be performed as an atomic operation to prevent data corruption (e.g., a client rewriting the same data as the rehydration process). The unique identifiers can be ordered by time and the write operations can be performed with a "guard" attribute to make sure that the data being written has a unique identifier that is greater than any data already written. Thus, if the rehydration write operation is attempting to write data with a unique identifier that is less than that already written, then this can indicate that the data associated with the new write operation includes stale data. In such instances, the write request can be rejected to preserve the integrity of the block-data repository. Thus, if multiple clients initiate the deep rehydration process for the same data at approximately the same time, the distributed storage system can transparently detect and prevent stale data (e.g., data retrieved from a snapshot captured at an earlier time) from overwriting newer data (e.g., that same data retrieved from a snapshot captured at a later time).

Figure 5:
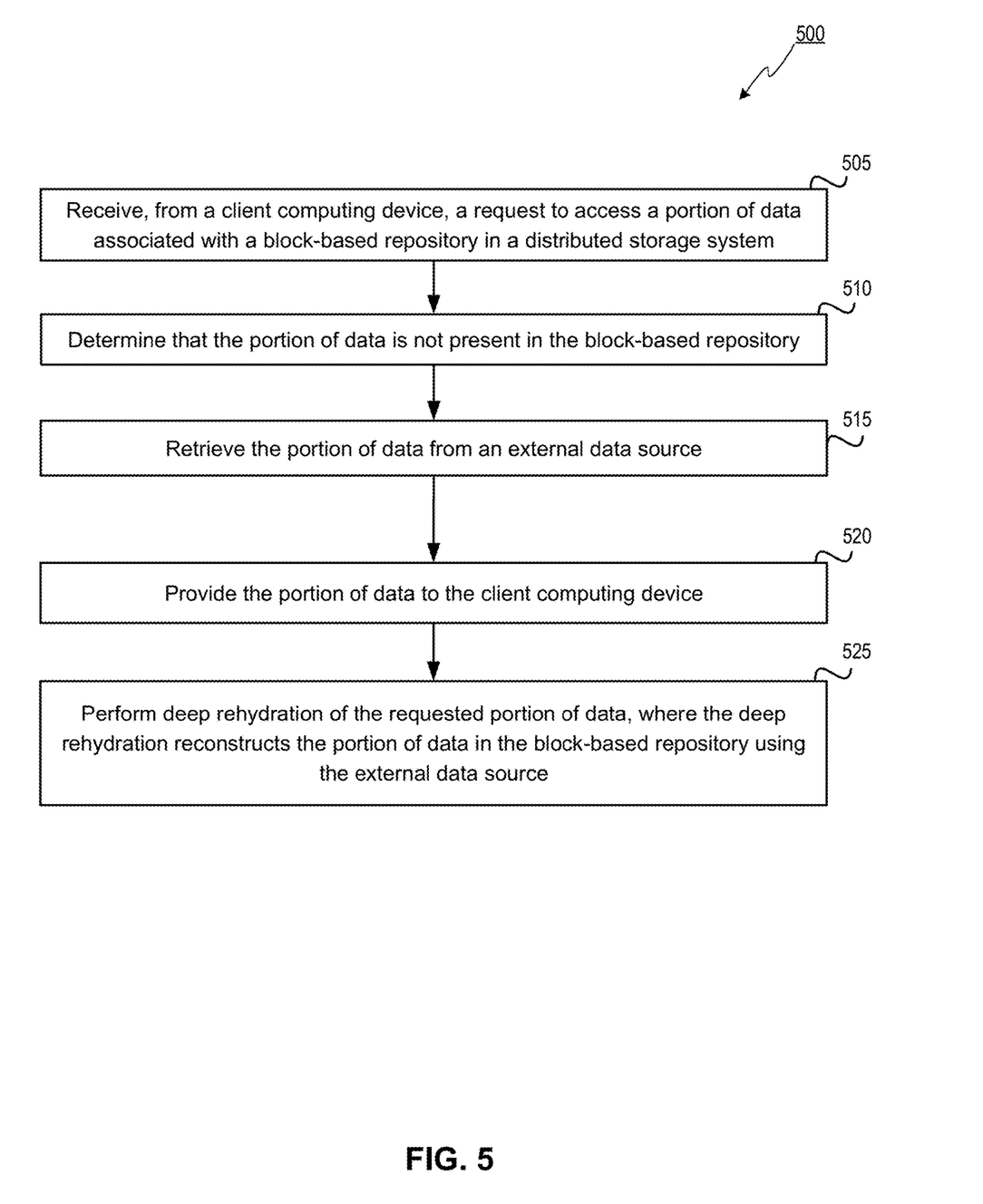
FIG. 5 is a flow diagram of an example method of facilitating instant deep rehydration of a block storage device from external storage, in accordance with one or more aspects of the present disclosure.

FIG. 5 depicts a flow diagram of an example method 500 for facilitating instant deep rehydration for a block storage device from external storage. The method may be performed by processing logic that may comprise hardware (circuitry, dedicated logic, etc.), computer readable instructions (run on a general purpose computer system or a dedicated machine), or a combination of both. In an illustrative example, method 500 may be performed by block device rehydration manager 125 in FIG. 1 or block device rehydration manager 410 in FIG. 4. Alternatively, some or all of method 500 might be performed by another module or machine. It should be noted that blocks depicted in FIG. 5 could be performed simultaneously or in a different order than that depicted.

At block 510, processing logic receives, from a client computing device, a request to access a portion of data associated with a block-based repository in a distributed storage system. In some implementations, the block-based repository can be associated with an external data source that stores a backup of the block-based repository. At block 510, processing logic determines that the portion of data is not present in the block-based repository. At block 515, processing logic retrieves the portion of data from the external data source. At block 520, processing logic provide the retrieved portion of data to the client computing device. At block 525, processing logic performs deep rehydration of the requested portion of data, where the deep rehydration reconstructs the portion of data in the block-based repository using the external data source.

Figure 6:
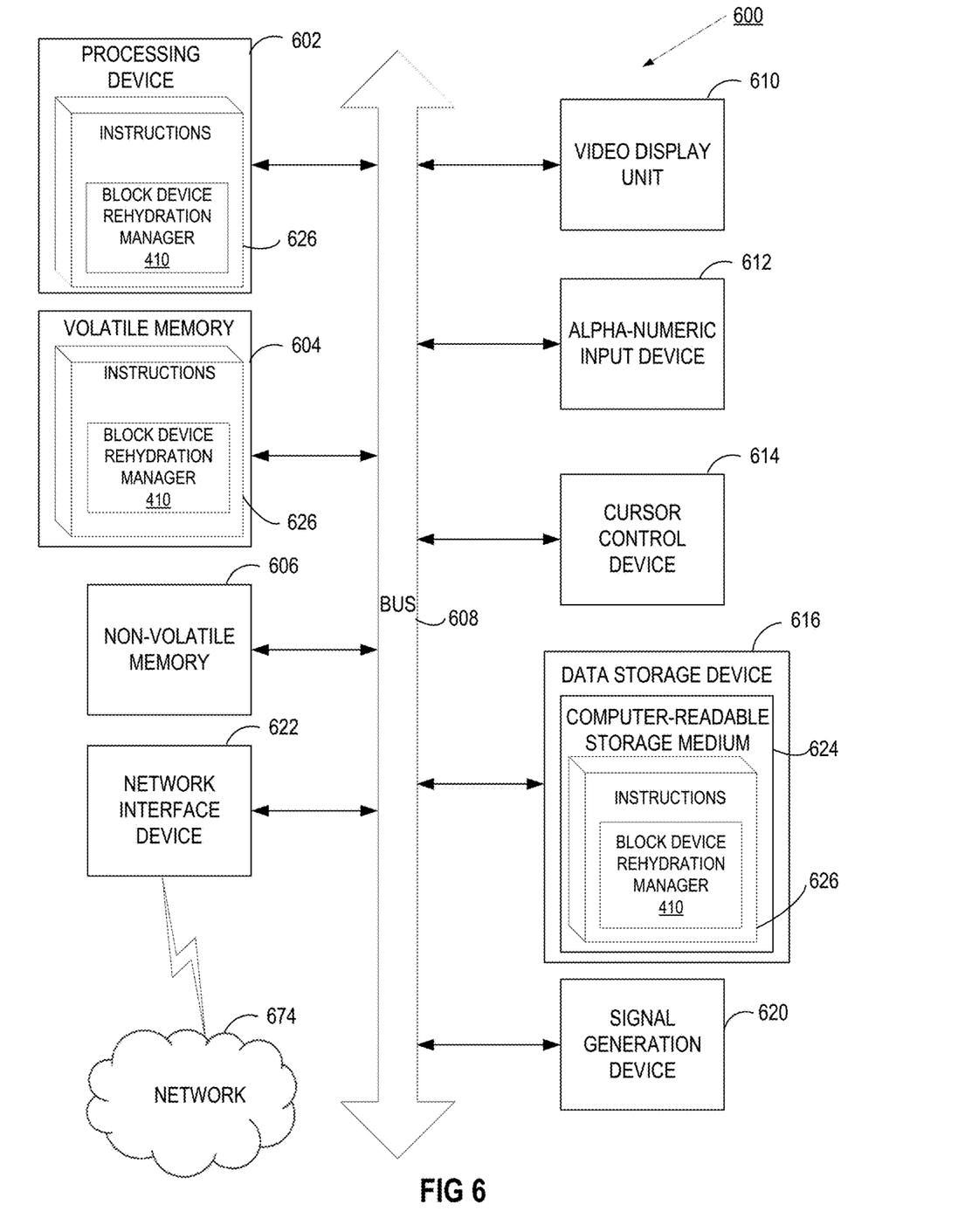
FIG. 6 illustrates a diagrammatic representation of a machine in the exemplary form of a computer system, in accordance with one or more aspects of the present disclosure.

FIG. 6 illustrates a diagrammatic representation of a machine in the exemplary form of a computer system 600 within which a set of instructions, for causing the machine to perform any one or more of the methodologies discussed herein, may be executed. The computer system 600 may correspond to computer system 100 of FIG. 1. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 616 (e.g., a data storage device), which communicate with each other via a bus 650.

The processing device 602 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 602 may therefore include multiple processors. The processing device 602 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 602 may also be one or more special-purpose processing devices such as an application specific integrated circuit (ASIC), a field programmable gate array (FPGA), a digital signal processor (DSP), network processor, or the like.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The secondary memory 621 may include a machine-readable storage medium (or more specifically a computer-readable storage medium) 628 on which is stored one or more sets of instructions 626 embodying any one or more of the methodologies or functions described herein (e.g., block device rehydration manager 410). The instructions 626 may also reside, completely or at least partially, within the main memory 604 and/or within the processing device 602 during execution thereof by the computer system 600; the main memory 604 and the processing device 602 also constituting machine-readable storage media.

While computer-readable storage medium 628 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by component modules or functional circuitry within hardware devices. Further, the methods, components, and features may be implemented in any combination of hardware devices and computer program components, or in computer programs.

Unless specifically stated otherwise, terms such as "receiving," "determining," "retrieving," "providing," "performing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

What is claimed is:

1. A method, comprising:
receiving, by a processing device and from a client computing device, a request to access a portion of data associated with a block-based repository in a distributed storage system, wherein the block-based repository is associated with an external data source that stores a backup of the block-based repository;
determining that the portion of data is not present in the block-based repository;
retrieving the portion of data from the external data source;
providing the portion of data to the client computing device; and
performing, by the processing device, deep rehydration of the requested portion of data, wherein the deep rehydration reconstructs a chain of block device snapshots associated with the portion of data in the block-based repository using the external data source.

2. The method of claim 1, wherein the backup of the block-based repository comprises a first block device snapshot of data stored at the block-based repository at a first time, a second block device snapshot of the data stored at the block-based repository at a second time that occurs before the first time, and a snapshot delta comprising data reflecting a difference between the second block device snapshot and the first block device snapshot.

3. The method of claim 2, further comprising:
configuring the block-based repository with a first block image; and
linking the first block image with the first block device snapshot at the external data source, wherein the first block image is a child node of the first block device snapshot.

4. The method of claim 3, wherein performing the deep rehydration of the requested portion of data comprises:
responsive to determining that the first block device snapshot comprises a first version of the portion of data:
creating a third block device snapshot of the portion of data in the block-based repository, wherein the third block device snapshot comprises a copy of the first block device snapshot; and
copying the first version of the portion of data from the first block device snapshot to the third block device snapshot.

5. The method of claim 4 further comprising:
responsive to determining that the deep rehydration of the requested portion of data has completed, modifying an index to indicate that the portion of data is present in the block-based repository.

6. The method of claim 5 further comprising:
receiving a second request to access the portion of data associated with the block-based repository; and
retrieving the portion of the data from the block-based repository.

7. The method of claim 1 further comprising:
performing deep rehydration of additional portions of data associated with the block-based repository, wherein the deep rehydration reconstructs a chain of block device snapshots associated with the additional portions of data in the block-based repository using the external data source.

8. The method of claim 7 further comprising:
responsive to determining that the deep rehydration of the additional portions of data has completed:
modifying an index to indicate that the additional portions of data are present in the block-based repository;
linking the first block image with the third block device snapshot in the block-based repository, wherein the first block image is a child node of the third block device snapshot; and
deleting the link between the first block image and the external data source.

9. The method of claim 1, wherein performing the deep rehydration of the requested portion of data comprises:
identifying a first version of the portion of data in the backup of the block-based repository, wherein the first version of the portion of data is associated with a source block device snapshot at a first time;
determining a first timestamp identifier associated with the source block device snapshot;
determining a destination block device snapshot in the block-based repository for rehydrating the first version of the portion of data, wherein the destination block device snapshot is associated with a second time; and
responsive to determining that the second time occurs after the first time, aborting the rehydration of the first version of the portion of data.

10. A system comprising:
a memory; and
a processing device operatively coupled to the memory, the processing device to:
receive, from a client computing device, a request to access a portion of data associated with a block-based repository in a distributed storage system, wherein the block-based repository is associated with an external data source that stores a backup of the block-based repository;
determine whether the portion of data is present in the block-based repository; and
responsive to determining that the portion of data is not present in the block-based repository:
retrieve the portion of data from the external data source;
provide the portion of data to the client computing device; and
perform deep rehydration of the requested portion of data, wherein the deep rehydration reconstructs a chain of block device snapshots associated with the portion of data in the block-based repository using the external data source.

11. The system of claim 10, wherein the processing device is further to:
configure the block-based repository with a first block image; and
link the first block image with a first block device snapshot at the external data source, wherein the first block image is a child node of the first block device snapshot.

12. The system of claim 11, wherein to perform the deep rehydration of the requested portion of data, the processing device is to:
responsive to determining that the first block device snapshot comprises a first version of the portion of data:

create a second block device snapshot of the portion of data in the block-based repository, wherein the second block device snapshot comprises a copy of the first block device snapshot; and copy the first version of the portion of data from the first block device snapshot to the third block device snapshot.

13. The system of claim 10, wherein the processing device is further to:

responsive to determining that the deep rehydration of the requested portion of data has completed, modify an index to indicate that the portion of data is present in the block-based repository.

14. The system of claim 10, wherein the processing device is further to:

perform deep rehydration of additional portions of data associated with the block-based repository, wherein the deep rehydration reconstructs a chain of block device snapshots associated with the additional portions of data in the block-based repository using the external data source.

15. The system of claim 14, wherein the processing device is further to:

responsive to determining that the deep rehydration of the additional portions of data has completed:
- modify an index to indicate that the additional portions of data are present in the block-based repository;
- link the first block image with the third block device snapshot in the block-based repository, wherein the first block image is a child node of the third block device snapshot; and
- delete the link between the first block image and the external data source.

16. A non-transitory computer readable medium storing instructions which, when executed by a processing device, cause the processing device to:

receive, from a client computing device, a request to access a portion of data associated with a block-based repository in a distributed storage system, wherein the block-based repository is associated with an external data source that stores a backup of the block-based repository;

determine whether the portion of data is present in the block-based repository; and responsive to determining that the portion of data is not present in the block-based repository:
- retrieve the portion of data from the external data source;
- provide the portion of data to the client computing device; and
- perform deep rehydration of the requested portion of data, wherein the deep rehydration reconstructs a chain of block device snapshots associated with the portion of data in the block-based repository using the external data source.

17. The non-transitory computer readable medium of claim 16, wherein the processing device is further to:

configure the block-based repository with a first block image; and link the first block image with a first block device snapshot at the external data source, wherein the first block image is a child node of the first block device snapshot.

18. The non-transitory computer readable medium of claim 17, wherein the processing device is further to:

responsive to determining that the first block device snapshot comprises a first version of the portion of data:
- create a second block device snapshot of the portion of data in the block-based repository, wherein the second block device snapshot comprises a copy of the first block device snapshot; and
- copy the first version of the portion of data from the first block device snapshot to the third block device snapshot.

19. The non-transitory computer readable medium of claim 16, wherein the processing device is further to:

responsive to determining that the deep rehydration of the requested portion of data has completed, modify an index to indicate that the portion of data is present in the block-based repository.

20. The non-transitory computer readable medium of claim 16, wherein the processing device is further to:

perform deep rehydration of additional portions of data associated with the block-based repository, wherein the deep rehydration reconstructs a chain of block device snapshots associated with the additional portions of data in the block-based repository using the external data source; and responsive to determining that the deep rehydration of the additional portions of data has completed:
- modify an index to indicate that the additional portions of data are present in the block-based repository;
- link the first block image with the third block device snapshot in the block-based repository, wherein the first block image is a child node of the third block device snapshot; and
- delete the link between the first block image and the external data source.

* * * * *